US008839548B2

(12) United States Patent
Manlick et al.

(10) Patent No.: US 8,839,548 B2
(45) Date of Patent: Sep. 23, 2014

(54) ICE FISHING INDICATOR DEVICE

(76) Inventors: Terry John Manlick, Green Bay, WI (US); Rick Francis Manlick, Manitowoc, WI (US)

( * ) Notice: Subject to any disclaimer, the term of this patent is extended or adjusted under 35 U.S.C. 154(b) by 398 days.

(21) Appl. No.: 13/372,448

(22) Filed: Feb. 13, 2012

(65) Prior Publication Data
US 2012/0210626 A1   Aug. 23, 2012

Related U.S. Application Data

(60) Provisional application No. 61/444,754, filed on Feb. 20, 2011.

(51) Int. Cl.
*A01K 97/12* (2006.01)
*A01K 97/01* (2006.01)

(52) U.S. Cl.
CPC .................................... *A01K 97/01* (2013.01)
USPC ............................................................. 43/17

(58) Field of Classification Search
USPC ............................................................. 43/17
IPC ........................................... A01K 97/12,91/06
See application file for complete search history.

(56) References Cited

U.S. PATENT DOCUMENTS

| 4,373,287 A * | 2/1983 | Grahl ................................ 43/17 |
| 4,780,979 A * | 11/1988 | Dyck et al. ........................ 43/17 |
| 4,953,317 A * | 9/1990 | Ruchel ............................. 43/17 |
| 6,088,945 A | 7/2000 | Sanderfoot |
| 6,564,496 B2 | 5/2003 | Scherg |
| 7,185,456 B1 * | 3/2007 | Schoenecker et al. ............ 43/17 |
| 7,207,133 B2 | 4/2007 | Schiemann et al. |

* cited by examiner

*Primary Examiner* — Darren W Ark
*Assistant Examiner* — Thien Thanh Pham
(74) *Attorney, Agent, or Firm* — Baker Donelson; Peter L. Brewer (57) ABSTRACT

An ice fishing device enclosed in a housing and configured for indicating that a fish has taken the bait is disclosed. The device provides a curved rod having a portion external to the housing and a portion internal to the housing. The portion inside the housing includes a curved end adapted for resting on a handle tip of the fishing spool. The curved end will release from the handle tip when a fish tugs on the fishing line, thereby moving the spool and the handle tip away from the curved end. Once the curved end is released, the curved rod containing a flag repositions to an upright position, alerting the fisherman that the fish is ready to be pulled out of the ice.

19 Claims, 7 Drawing Sheets

ICE FISHING INDICATOR DEVICE

RELATED APPLICATIONS

This application claims priority from provisional application No. 61/444,754 filed on Feb. 20, 2011.

FIELD OF THE INVENTION

The present invention relates to a device for indicating to an ice fisherman that a fish has taken the bait so that he or she may then proceed to pull up the fishing line.

BACKGROUND OF THE INVENTION

When a fishing line is lowered into the water through a hole in the ice, the fisherman is disadvantaged by the fact that the movement of fish in the ice is not visible. This makes it difficult for the fisherman to know when a fish has taken the bait that would necessitate action to raise the fishing line. The device of the present invention solves the problem by providing a mechanism for tipping a rod into a vertical position triggered by the fish taking the bait and tugging on the fishing line. The repositioning of the rod alerts the fisherman that a fish is caught in the fishing line hook and the fishing line along with the fish needs to be pulled out of the water.

SUMMARY OF THE PRESENT INVENTION

In one aspect of the present invention, a device for indicating that a fish has taken bait in ice fishing, the device comprises: a housing containing an indicator mechanism, the housing comprising a ceiling wall, a front wall, a rear wall opposite the front wall, a first side wall, a second side wall opposite to the first side wall and an open bottom, the front wall comprising a cover adapted for opening and closing in such a manner as to allow access to the indicator mechanism, the open bottom of the housing being adapted for placement over an opening in the ice, the indicator mechanism comprises a spool for winding a fishing line, the spool having a first side wheel and a second side wheel, the second side wheel having a non-rotating portion and a rotating portion adapted for rotating around the non-rotating portion, the non-rotating portion being attached to the ceiling wall, the first side wheel and the rotating portion of the second side wheel being adapted for substantially free rotation in such a manner as to enable lowering or raising the fishing line into or from the opening in the ice, the first side wheel being substantially parallel with the second side wheel; a handle tip attached to the first side wheel, the handle tip being substantially perpendicular to a plane defined by the first side wheel; the handle tip being adapted to rotate with the spool; a curved rod having one portion positioned inside the housing and another portion positioned outside the housing, the portion positioned inside the housing being substantially perpendicular to the portion outside the housing, the portion positioned inside the housing being configured to continue from the outside of the housing to the inside of the housing through an opening in the first side wall, the curved rod portion positioned inside the housing having a perpendicular extension, the curved rod being adapted for pivoting full circle around and inside the opening in the first side wall, the curved rod being configured for normal balancing in a position wherein the portion positioned outside the housing is perpendicular to a plane defined by the ice; and the perpendicular extension having an end containing a hook, the hook being adapted for clasping onto the handle tip in a manner that the portion positioned outside the housing is substantially parallel with a plain defined by the ice and in a manner that an end of the fishing line containing a bait is positioned inside the opening in the ice, and in a manner that clasping forces exerted by the hook onto the handle tip are balanced by weight forces exerted by the fishing line and bait and in a manner that a fish tugging on the bait moves the handle tip downward in a manner as to release the clasping of the hooked end, thereby allowing the curved rod to move to an upright position wherein the outside portion of the curved rod is perpendicular to the ice.

In another aspect of the present invention, a method for rendering a device for indicating that a fish has taken bait in ice fishing user ready comprises: providing the aforementioned indicating device; from an upright position, or from a parked position of the curved rod wherein the hooked end is held by a tip attached to the bar connecting the spool to the ceiling wall, maneuvering the indicator mechanism to a user ready position wherein the hooked end attached to the curved rod clasps onto the handle tip in a manner that the end of the fishing line and the bait attached to it are immersed into the opening in the ice; and adjusting the weight on the perpendicular extension to a position such that a resulting pull force applied to the hooked end is in proper balance with a weight of the line and bait in a way that this balance may only be disturbed by a fish tugging onto the bait.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The present invention relates to a device for signaling an ice fisherman that a fish has taken the bait so he or she may proceed to pull up the fishing line. The device is contained in an angled front housing box adapted with a lid that provides access to the device as needed. The box is heated from the inside to maintain the open hole drilled into the ice through which a fishing line is lowered. In order to prevent heat from escaping, the lid needs to be kept closed when the device is in use. This, however, makes it difficult for the fisherman to know when a fish has taken the bait that would necessitate action to raise the fishing line. The device of the present invention solves the problem by providing a mechanism for raising a colored ball triggered by the fish taking the bait and tugging on the fishing line.

The present invention is illustrated in FIGS. 1-7. The device is contained in a four sided housing box 34 that has an open bottom, a front panel 12, and a hinged lid 11 that flips open to enable access to the device as needed. When in use, the box 34 is placed on an area of ice 35 through which a hole 14 is drilled, thereby exposing water through which a fishing line 15 is lowered.

The housing contains a heating system that maintains the temperature sufficiently warm so that the hole 14 in the ice 35 does not freeze over. In the preferred embodiment of the present invention, the heating system comprises of charcoals 22 contained in an open top can 21 which in turn is contained in a larger open top can 19. Both cans are positioned at a slight angle to expose the charcoal to sufficient air to feed the fire.

Figure 3:
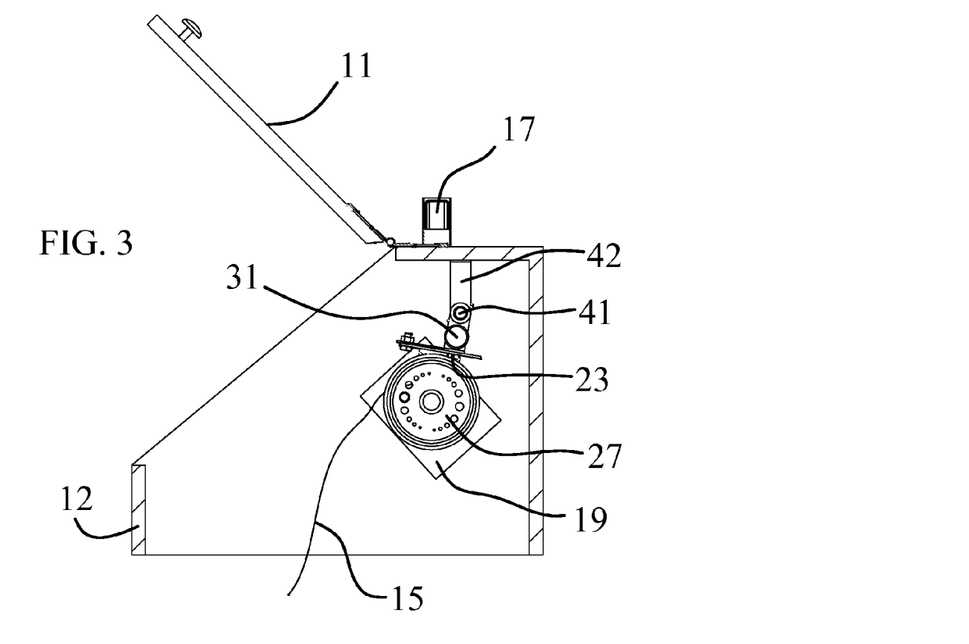
FIG. 3 is a side cross sectional view of the device with an open lid showing the fishing line reel in a forward position according to an embodiment of the present invention.
Figure 3A:
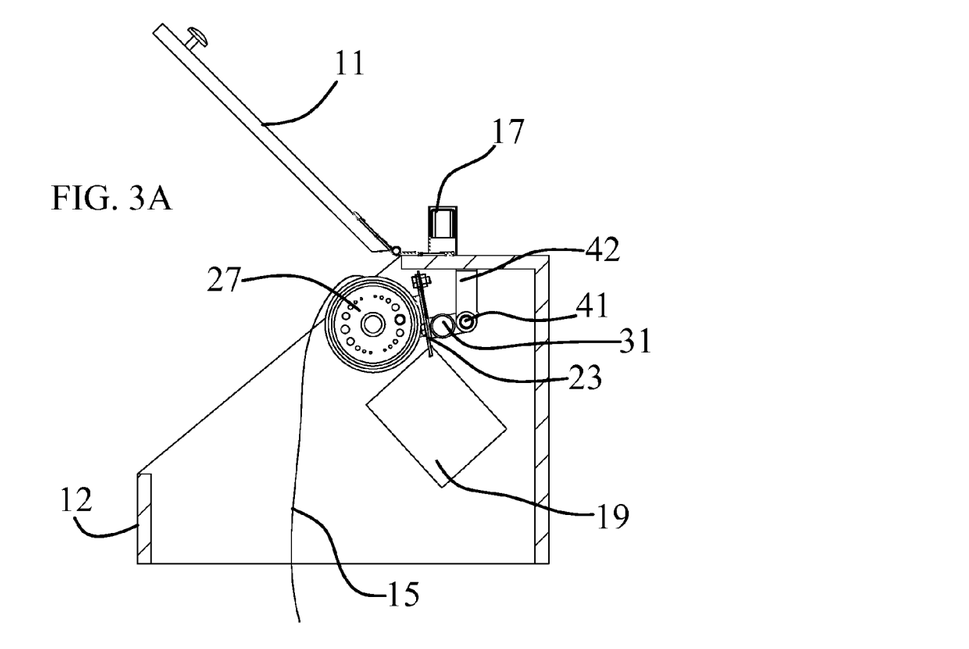
FIG. 3A is the side cross sectional view of the device of FIG. 3 showing the fishing line reel in a back position according to an embodiment of the present invention.
Figure 4:
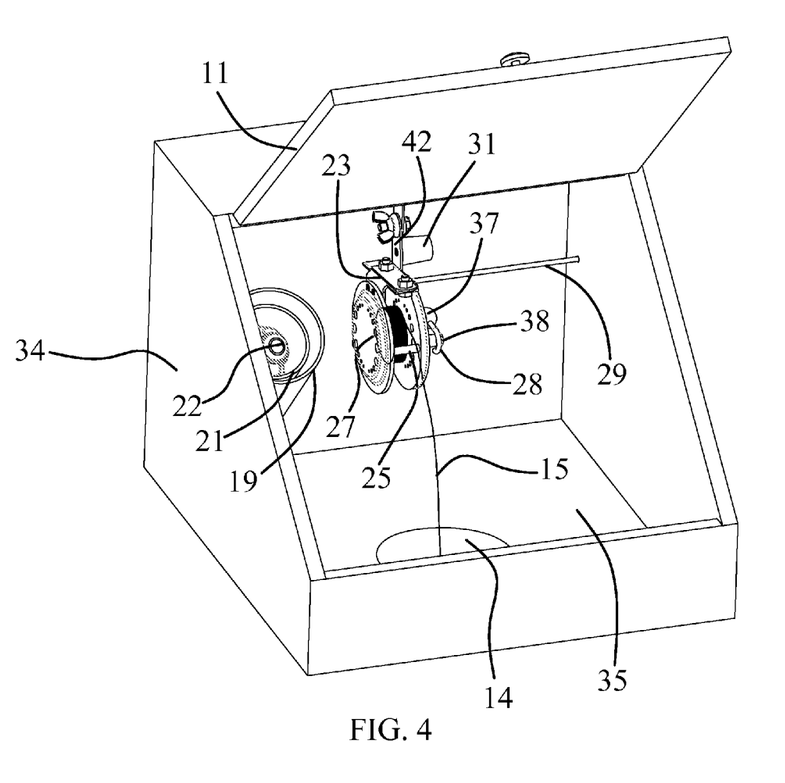
FIG. 4 is a front perspective view of the device with an open lid in a cocked, i.e., user ready position according to an embodiment of the present invention.

The indicator device comprises an aluminum fishing reel or spool 27 attached to the inner ceiling of the housing 34 using a horizontal attaching bar 23 and a vertical attaching bar 42 through a non-rotating portion of the spool. The fishing line 15 is wound onto the reel 27. A swivel mechanism 41 enables pivoting the reel 27 between a back position to a forward position as shown in FIGS. 3 and 3A. The back position is configured to allow easier access to the hole in the ice when removing a fish. A center position for the reel would be for normal fishing when the tip up is set waiting for a bite. The full forward position would be for easy access to the reel 27 when winding up the line after the fisherman is done with fishing. The reel 27 can be locked down anywhere between the full back and the full forward positions. The reel 27 is configured to separate into two pieces with the push of a button for easy cleaning and lubrication.

The tip-up or indicator mechanism also includes a curved rod 29 that has a portion disposed horizontally inside the housing 34 that continues through a side wall of the housing 34 and continues outside the housing 34 with portion 32 external to the housing 34 that is disposed at approximately a straight angle relative to the inside portion of the rod 29. A colored signal ball 33 is disposed on the end of the curved rod external potion 32. The inside portion of the rod 29 has an offset hooked end 28 and a slide weight 37 disposed over the hooked end 28. A handle tip 38 is attached to the reel 27 on the same side where the inside portion of the rod 29 and hooked end 28 are located. The rod 29 is adapted to swivel around its inside portion. The offset of the hooked end 28 prevents the reel handle tip 38 from hitting the hooked end 28 if a fish pulls really hard on the initial strike.

When placing the end of the fishing line 15 along with a bait attached to it into the ice 35 in a position for baiting the fish, the tip up mechanism is cocked by swiveling the rod 29 into a position that allows placing the hooked end 28 of the rod 29 over the handle tip 38. If a fish grabs onto the fishing line bait (not shown), the tugging of the fishing line 15 and reel 27 by the fish will move the handle tip 38 backward, thereby releasing the hooked end 28 of the rod 29. This causes the external portion of the rod 32 to tip upward into a vertical position aided by the downward movement by gravity of the attached slide weight 37. As a result, the colored signal ball 33 moves to a raised position over the housing 34, signaling to the fisherman that a fish has taken the bait (not shown). The fisherman will then pull in the fish. It should be noted that other signaling indicia for indicating that the fish has taken the bait such as flags and figurines attached to the outer portion of the rod 32 are also within the scope of the present invention. The slide weight 37 can slide and is fastenable onto any spot along the inside portion of the rod 29. When the device is in the cocked or user ready position, positioning the slide weight 37 close to the hooked end 28 adjusts the tip up trigger for a strong fish bite, while positioning the slide weight 37 further away from the hooked end 28 adjusts the tip up trigger for a weak fish bite.

Figure 1:
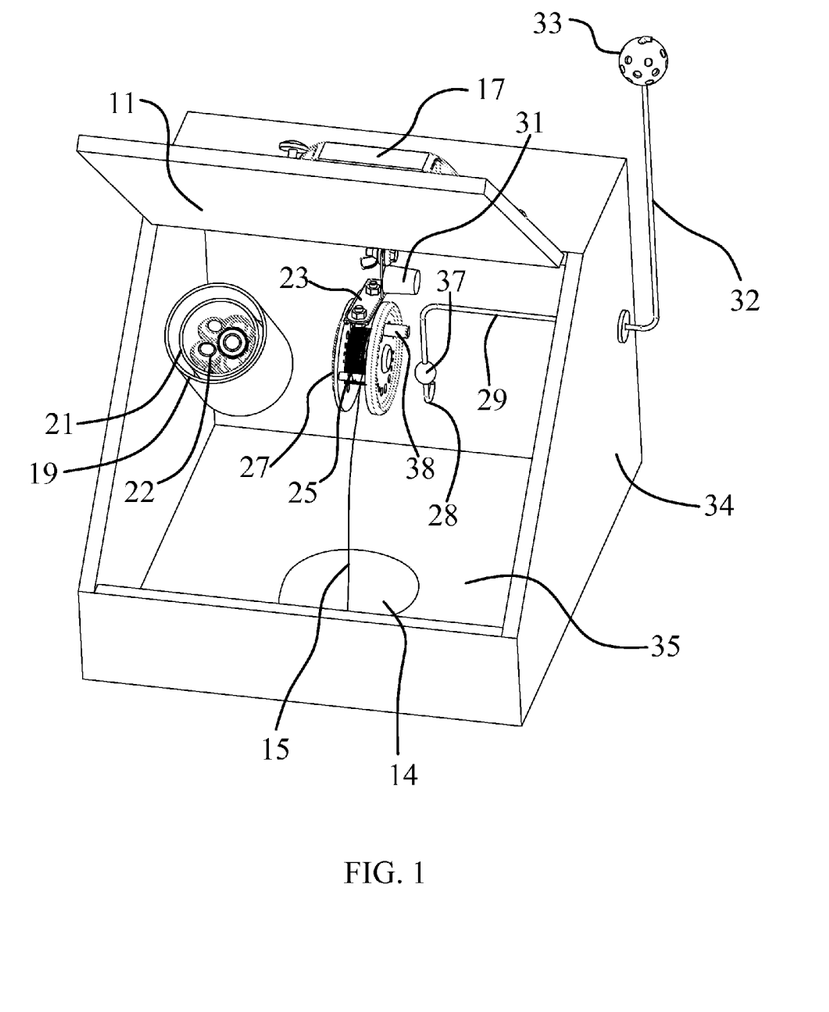
FIG. 1 is a front perspective view of the device in an open housing un-cocked position according to an embodiment of the present invention.
Figure 2:
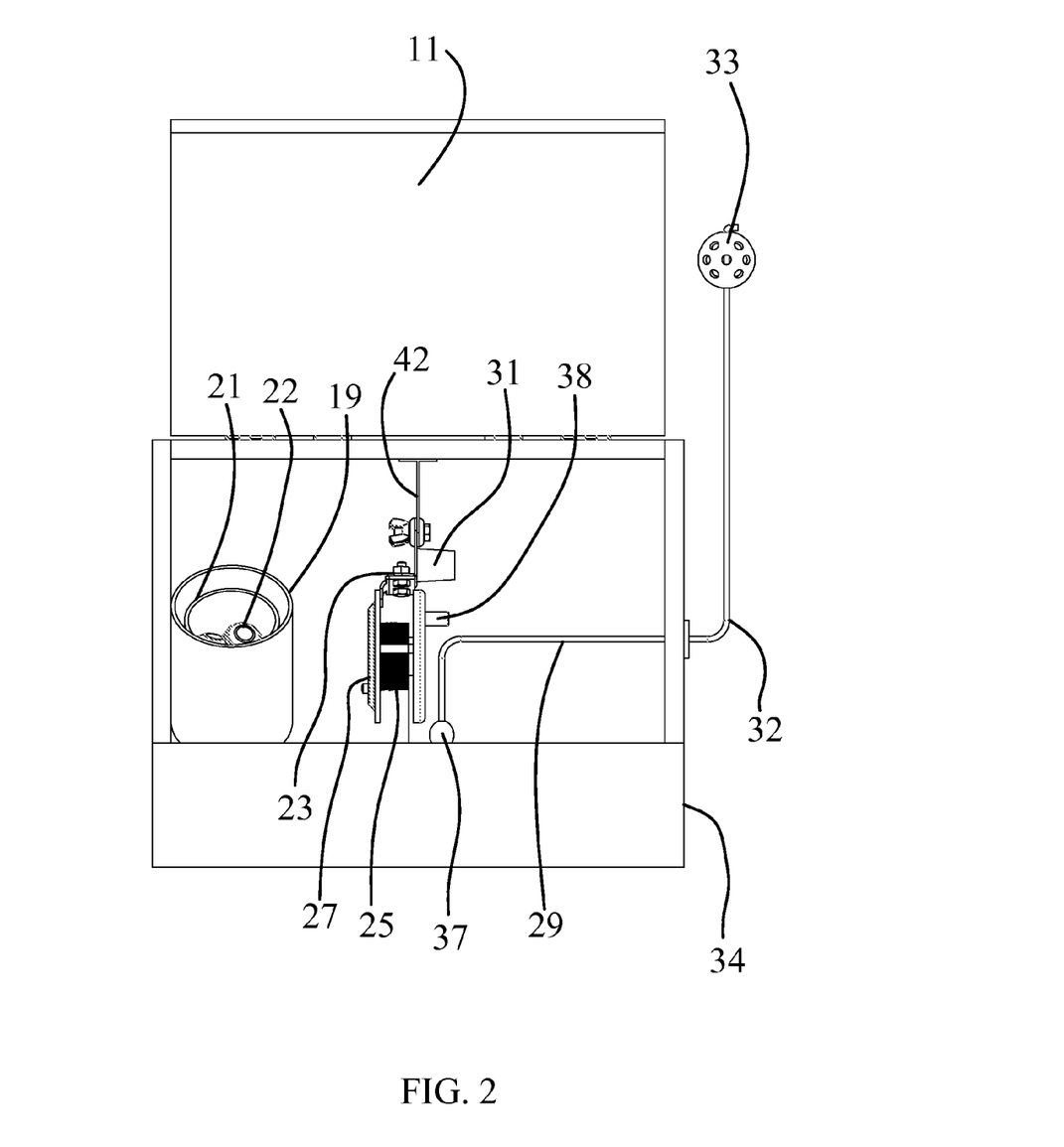
FIG. 2 is a bottom perspective view of the device in an open housing un-cocked position according to an embodiment of the present invention.
Figure 5:
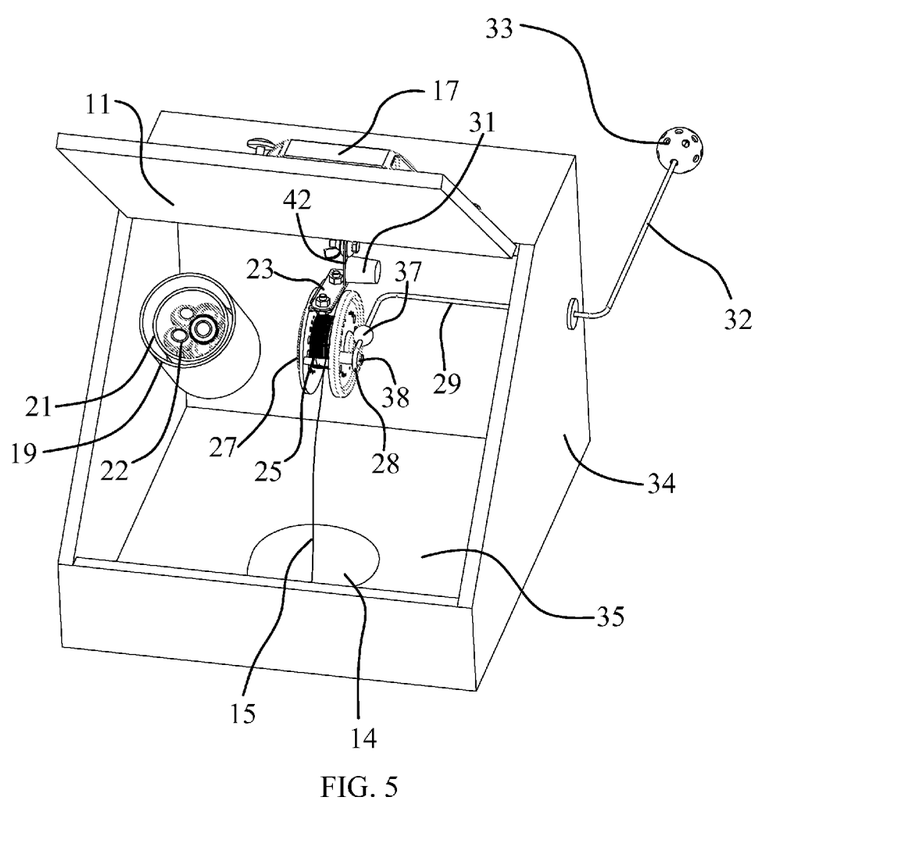
FIG. 5 is another front perspective view of the device with an open lid in a cocked position according to an embodiment of the present invention.
Figure 6:
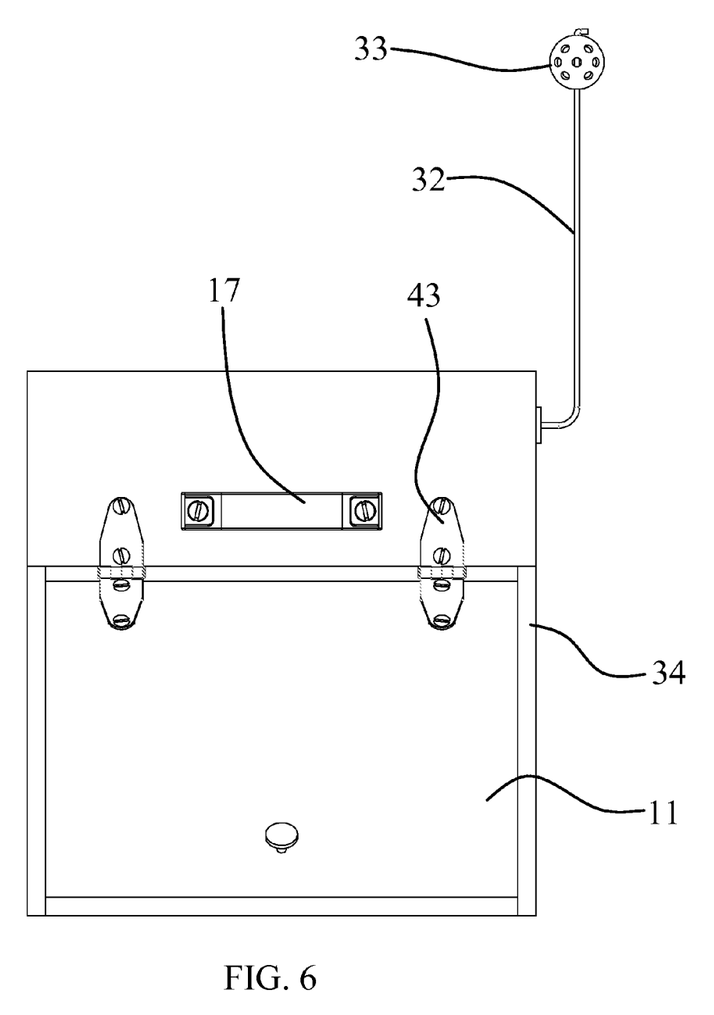
FIG. 6 is a top view of the closed housing box containing the device in a cocked position according to an embodiment of the present invention.
Figure 7:
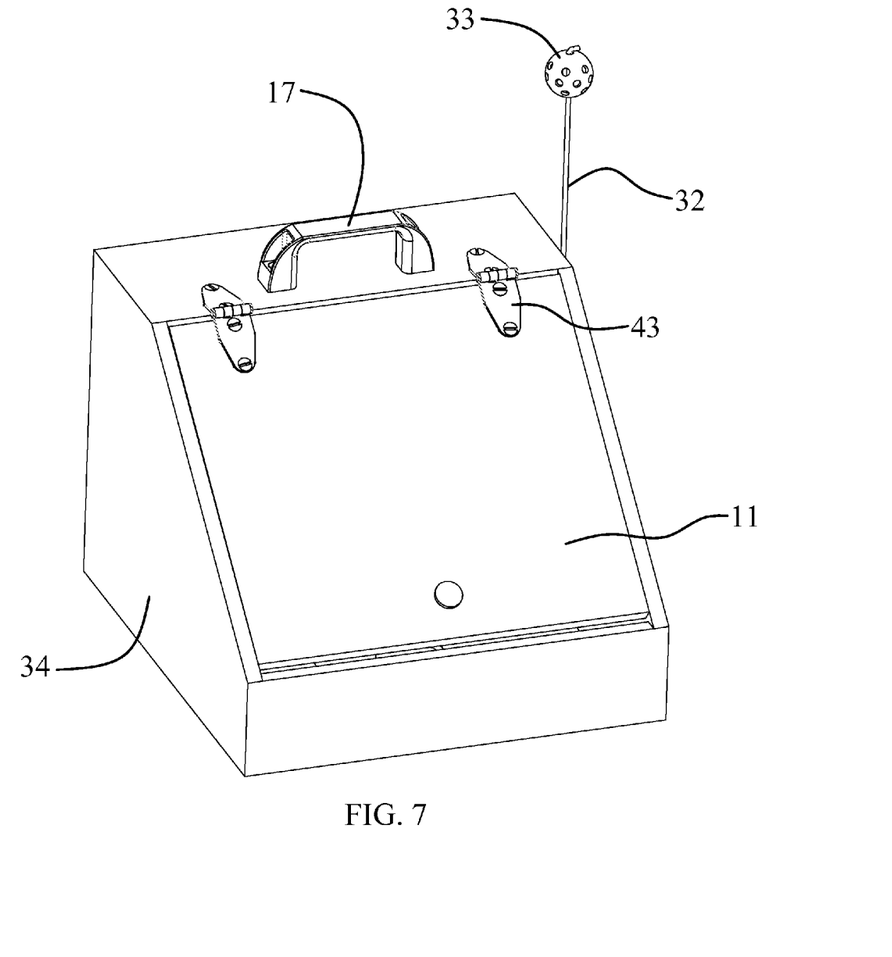
FIG. 7 is a front perspective view of the closed housing box containing the device in an un-cocked position according to an embodiment of the present invention.

Additional features shown in FIGS. 6 and 7 include the hinges 43 for the lid 11 and a housing handle 17 for carrying the housing 34. A parking tip such as a cork 31 may be attached to the vertical attaching bar 42 of the reel 27. The cork 31 is used to park the hooked end 28 of the rod 28 when not in use. The reel 27 is adapted with a resistance setting clicker to allow for stronger or lighter bites and hooked end 28 tension when the hooked end 28 is stored on the parking tip 31. When the device is not in use, the curved rod 32 is in an upright position in which it is configured to normally balance as shown in FIGS. 1 and 2. Alternatively, the hooked end 28 at the end of the curved rod 32 may be parked on the parking tip 31. In a ready to use or cocked position, the hooked end 28 is clasped onto the handle tip 38 as shown in FIG. 5.

While the preferred embodiment for providing heat inside the housing 34 is the use of coal 22, other types of heating devices such as LP burners, candles, and oil burning devices also fall within the scope of the present invention.

It should be understood, of course, that the foregoing relates to exemplary embodiments of the invention and that modifications may be made without departing from the spirit and scope of the invention.

We claim:

1. A device for indicating that a fish has taken bait during ice fishing, the device comprising:

a housing containing an indicator mechanism, said housing comprising a ceiling wall, a first side wall, a second side wall opposite to said first side wall, an open bottom, and a hinged lid adapted for opening and closing in such a manner as to allow access to the indicator mechanism, said open bottom of said housing being adapted for placement over an opening in the ice, said indicator mechanism comprising:

a spool for winding a fishing line, said spool having a first side wheel and a second side wheel, said second side wheel having a non-rotating portion and a rotating portion adapted for rotating relative to the non-rotating portion, said non-rotating portion being attached to the ceiling wall, said first side wheel and said rotating portion of the second side wheel being adapted for rotation relative to the housing to enable lowering of the fishing line into water below the opening in the ice;

a handle tip attached to and extending away from the first side wheel, said handle tip being adapted to rotate with the spool;

a curved rod having a first portion positioned inside the housing and a second portion positioned outside the housing, said portion positioned inside the housing being configured to continue from the outside of the housing to the inside of the housing through an opening in the first side wall, said curved rod portion positioned inside the housing having a perpendicular extension, said curved rod being adapted for pivoting inside the opening in the first side wall; and a bracket assembly for pivotally connecting the non-rotating portion of the spool with the ceiling wall such that the spool may be pivoted within the housing from a first forward and raised position that allows greater access to the spool, to a second rearward and lowered position that allows greater access to the opening in the ice;

wherein:

the perpendicular extension has a curved end adapted for resting on the handle tip in a manner that the second portion of the curved rod positioned outside the housing is substantially parallel with a plane defined by the ice, and further in a manner that an end of the fishing line containing a bait is positioned in the water below the ice such that gravitational forces exerted by the curved end onto the handle tip are balanced by weight forces exerted by the fishing line and bait, and still further in a manner that a fish in the water tugging on the bait rotates the handle tip downward and rearward in a manner as to release the curved end so that the curved rod portion that is outside of the housing rotates into a position that is perpendicular to the ice; and pivoting of the spool from its first position to its second position while the curved end of the curved rod is resting on the handle tip increases sensitivity of the gravitational forces exerted on the handle tip, requiring the fish to pull with progressively less force to turn the handle tip.

2. The device of claim 1, further comprising:
a weight slidably residing along the perpendicular extension of the curved rod, wherein adjustment of the weight towards the curved end of the curved rod while the curved end is resting on the handle tip progressively decreases the sensitivity of the gravitational forces exerted on the handle tip.

3. The device of claim 1, further comprising:
a signaling indicium attached to an end of the portion of the curved rod positioned outside of the housing.

4. The device of claim 3, wherein the signaling indicium comprises a substantially spherical orb having perforations therein.

5. The device of claim 1, further comprising:
a heating implement inside the housing for preventing the opening in the ice from freezing.

6. The device of claim 5, wherein the heating implement comprises a container, and (i) charcoal, (ii) a light, or (iii) a candle, residing inside the container.

7. The device of claim 1, wherein the curved end comprises an offset for preventing the handle tip from colliding with the curved end in case of a hard tug by the fish.

8. The device of claim 1, further comprising:
a parking tip connected to the bracket assembly and fabricated from cork.

9. The device of claim 1, wherein, upon balancing the curved end of the portion of the curved rod inside the housing on the handle tip, release of the curved end occurs primarily by a rotation of the rotating portion of the spool and connected handle tip about a horizontal axis.

10. The device of claim 9, wherein the indicator mechanism is configured so that release of the curved end further occurs by pivoting the spool relative to the housing from its first forward and raised position to its second rearward and lowered position.

11. A method for rendering a device for indicating that a fish has taken bait in ice fishing user ready, said method comprising:

A. providing an indicating device;
said device comprising:
a housing containing an indicator mechanism, said housing comprising a ceiling wall, one or more side walls, an open bottom, and a hinged lid adapted for opening and closing in such a manner as to allow access to the indicator mechanism, said indicator mechanism comprising: a spool for winding a fishing line, said spool having a first side wheel and a second side wheel, said second side wheel having a non-rotating portion and a rotating portion adapted for rotating relative to the non-rotating portion, said non-rotating portion being attached to the ceiling wall, said first side wheel and said rotating portion of the second side wheel being adapted for rotation relative to the housing to enable unspooling of the fishing line into water below an opening in the ice;
a handle tip attached to and extending away from the first side wheel, said handle tip being adapted to rotate with the rotating portion of the spool;
a curved rod having a first portion positioned inside the housing and a second portion positioned outside the housing, said portion positioned inside the housing being configured to continue from the outside of the housing to the inside of the housing through an opening in said one or more side walls, said curved rod portion positioned inside the housing having a perpendicular extension, said curved rod being adapted for pivoting inside the opening in said one or more side walls, said curved rod being configured for normal balancing in a position wherein the portion positioned outside the housing is perpendicular to a plane defined by the ice; and
a bracket assembly for pivotally connecting the non-rotating portion of the spool with the ceiling wall such that the spool may be pivoted within the housing from a first forward and raised position that allows greater access to the spool, to a second rearward and lowered position that allows greater access to the opening in the ice;
said perpendicular extension having a curved end adapted for resting on the handle tip in a manner that the portion of the curved rod positioned outside the housing is substantially parallel with a plane defined by the ice, and further in a manner that a fish in the water tugging on a bait rotates the handle tip downward in a manner as to allow the curved end to rotate down so that the curved rod portion that is outside of the housing is perpendicular to the ice;

B. placing the open bottom of the housing over the opening in the ice;
C. lowering the hook and fishing line through the opening in the ice and into the water there below;
D. maneuvering the indicator mechanism to a user ready position wherein the curved end attached to the curved rod gravitationally rests on the handle tip in a manner that the end of the fishing line and the bait attached to it are immersed in the body of water; and
E. adjusting a slidable weight residing along the perpendicular extension of the curved rod to a position such that a resulting pull force applied to the curved end is in proper balance with a weight of the fishing line and bait in a way that this balance may only be disturbed by a fish tugging on the bait.

12. The method of claim 11, wherein adjusting the slidable weight towards the curved end of the curved rod while the curved end is resting on the handle tip progressively decreases the sensitivity of the gravitational forces exerted on the handle tip, requiring the fish to pull with greater force to turn the handle tip.

13. The method of claim 12, wherein the indicating device further comprises:
a signaling indicium attached to an end of the portion of the curved rod positioned outside of the housing.

14. The method of claim 13, wherein the signaling indicium comprises a substantially spherical orb having perforations therein.

15. The method of claim 12, further comprising:
pivoting the spool from its first position to its second position while the curved end of the curved rod is resting on the handle tip to increase the sensitivity of the gravitational forces exerted on the handle tip, requiring the fish to pull with progressively less force to turn the handle tip.

16. The method of claim 15, wherein the heating implement comprises a container, and (i) charcoal, (ii) a light or (iii) a candle residing inside the container.

17. The method of claim 12, wherein:
the indicating device further comprises a heating implement inside the housing for preventing the opening in the ice from freezing; and
the method further comprises placing a heating implement inside the container, and closing the hinged lid to retain heat in the housing.

18. A fishing device comprising:
a housing containing an indicator mechanism, said housing comprising a ceiling wall, a first side wall, a second side wall, an open bottom, and a hinged lid adapted for opening and closing in such a manner as to allow access to the indicator mechanism, said open bottom of said housing being adapted for placement over an opening in a layer of ice;
a spool for winding a fishing line, the spool being pivotally connected to the ceiling wall such that the spool may be pivoted within the housing from a first forward and raised position that allows greater access to the spool, to a second rearward and lowered position that allows greater access to the opening in the ice, and wherein the spool has an axle upon which the fishing line is wound about a horizontal axis;
a handle tip attached to and extending away from a rotating portion of the spool, wherein pivoting of the spool from its first position to its second position while the curved end of the curved rod is resting on the handle tip require the fish to pull with progressively less force to turn the handle tip;
a curved rod having a first portion positioned inside the housing and a second portion positioned outside the housing, said portion positioned inside the housing being configured to continue from the outside of the housing to the inside of the housing through an opening in the first side wall, said curved rod being adapted for pivoting inside the opening in the first side wall;
a perpendicular extension at an end of the curved rod portion inside of the housing, said perpendicular extension being configured to rest on the handle tip in a manner that the portion positioned outside the housing is substantially parallel with a plane defined by the ice, and further in a manner that an end of the fishing line containing a bait is positioned in the water below the ice such that gravitational forces exerted by the curved end onto the handle tip are balanced by weight forces exerted by the fishing line and bait, and still further in a manner that a fish in the water tugging on the bait rotates the handle tip downward and rearward in a manner as to allow the perpendicular extension to rotate down so that the curved rod portion that is outside of the housing is perpendicular to the ice;
a weight slidably residing along the perpendicular extension of the curved rod, wherein adjustment of the weight towards the curved end of the curved rod while the perpendicular extension is resting on the handle tip requires the fish to pull with progressively greater force to turn the handle tip; and
a signaling indicium attached to an end of the portion of the curved rod positioned outside of the housing.

19. The device of claim 18, wherein:
the spool is connected to the ceiling wall by means of a bracket assembly comprising a vertical attaching bar and a swivel mechanism.

* * * * *